(12) United States Patent
Cagle et al.

(10) Patent No.: US 6,311,232 B1
(45) Date of Patent: Oct. 30, 2001

(54) METHOD AND APPARATUS FOR CONFIGURING STORAGE DEVICES

(75) Inventors: John M. Cagle, Houston; Gregory T. Noren, The Woodlands, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/363,439

(22) Filed: Jul. 29, 1999

(51) Int. Cl.[7] .................................................. G06F 13/00
(52) U.S. Cl. ........................... 710/8; 710/10; 713/1
(58) Field of Search ........................ 711/4, 111, 170, 711/112; 710/8, 10, 104; 713/1, 100

(56) References Cited

U.S. PATENT DOCUMENTS

| | | | |
|---|---|---|---|
| 5,193,184 | * | 3/1993 | Belsan et al. ........................ 395/600 |
| 5,596,723 | * | 1/1997 | Romohr ........................ 395/200.16 |
| 5,771,354 | * | 6/1998 | Crawford ........................ 395/200.59 |
| 5,890,204 | * | 3/1999 | Ofer et al. ............................ 711/111 |
| 6,098,119 | * | 8/2000 | Surugucchi et al. ................... 710/10 |
| 6,145,019 | * | 11/2000 | Firooz et al. ........................ 710/8 |
| 6,148,355 | * | 11/2000 | Mahalingam ........................ 710/104 |
| 6,212,585 | * | 4/2001 | Chrabaszcz ........................ 710/103 |

* cited by examiner

*Primary Examiner*—Kevin Verbrugge
(74) *Attorney, Agent, or Firm*—Williams, Morgan & Amerson, P.C.

(57) ABSTRACT

A method for configuring storage devices includes detecting an existing storage device configuration. The existence of a new storage device is detected, and the new storage device is configured based on the existing storage device configuration. A computer system includes an existing storage device, a new storage device, and a processor. The existing storage device has an existing storage device configuration, and the processor is adapted to detect the existence of the new storage device and configure the new storage device based on the existing storage device configuration.

22 Claims, 5 Drawing Sheets

METHOD AND APPARATUS FOR CONFIGURING STORAGE DEVICES

BACKGROUND OF THE INVENTION

1. Field of the Invention

This invention relates generally to computer systems, and, more particularly, to a method and apparatus for configuring storage devices.

2. Description of the Related Art

A computer network is a connection of points (e.g., a plurality of computers) that have been interconnected by a series of communication paths. Moreover, any number of individual computer networks may be interconnected with other computer networks, which may increase the complexity of the overall system. Generally, computer networks may be used to increase the productivity of those computers that are connected to the network. For example, a computer connected to a network may communicate with other computers that are also connected to the network. Furthermore, the computer network may be used to share data, peripherals, or any other resources that are made available on the network.

The interconnection of the various points on the computer network may be accomplished using a variety of known topologies. For example, the most common computer network topologies include the bus, star, and ring configurations. Furthermore, communication between the computers connected to the network may be accomplished using a variety of known protocols. For example, the connected computers may communicate using TCP/IP, SNA, and APPN.

Generally, a host computer (e.g., server) may function as a centralized point on the network. For example, using any of the network topologies discussed above, a plurality of client computers may be interconnected such that the server controls the movement of data across the network. The host computer may have an operating system that may be used to execute a server application program that is adapted to support multiple clients. Typically, the server may service requests from a plurality of client computers that are connected to the network. Furthermore, the server may be used to administer the network. For example, the server may be used to update user profiles, establish user permissions, and allocate space on the server for a plurality of clients connected to the network.

In many computer networks, a large amount of data may be stored on the server and accessed by the attached client computers. For example, each client computer may be assigned a variable amount of storage space on the server. The assigned storage spaces may be private (i.e., protected) or made available to other clients, and the assigned storage spaces may be used to store a variety of file types, such as documents, email messages, etc. Furthermore, the server may be used to save public data (i e., data that does not necessarily have a specific owner but may be accessed by any number of clients.) For example, public folders (i.e., directories) may be created on the server, and the public folders may store data that relates to group projects, company information, or any other data that may require access from more than one client.

The administration of a server is often a complex task that requires a great deal of software and hardware knowledge on the part of the administrator. Certain businesses may desire the functional advantages offered by a server, but may lack the expertise to effectively administer the server. Even if a server is initially configured by the manufacturer or some other installer, it is unlikely that the configuration will meet the needs of the business indefinitely.

As the business changes, so too will its requirements of the server. For example, as a business grows or collects more stored data, the storage provided by the server may be inadequate. As a result additional capacity may be needed. Also, if the business determines that periodic data backups are desired, a backup device may be required.

These types of configuration changes often require both hardware and software knowledge to successfully complete. A new disk drive or backup device may need to be added and configured to allow access to the new drive by the users of the network. Although computer consultants may be capable of providing the requisite expertise, they tend to be costly and may prove untimely. It is thus difficult for some network users to make the changes necessary to support their business operations.

The present invention is directed to overcoming, or at least reducing the effects of, one or more of the problems set forth above.

SUMMARY OF THE INVENTION

One aspect of the present invention is seen in a method for configuring storage devices. The method includes detecting an existing storage device configuration. The existence of a new storage device is detected, and the new storage device is configured based on the existing storage device configuration.

Another aspect of the present invention is seen in a computer system including an existing storage device, a new storage device, and a processor. The existing storage device has an existing storage device configuration, and the processor is adapted to detect the existence of the new storage device and configure the new storage device based on the existing storage device configuration.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
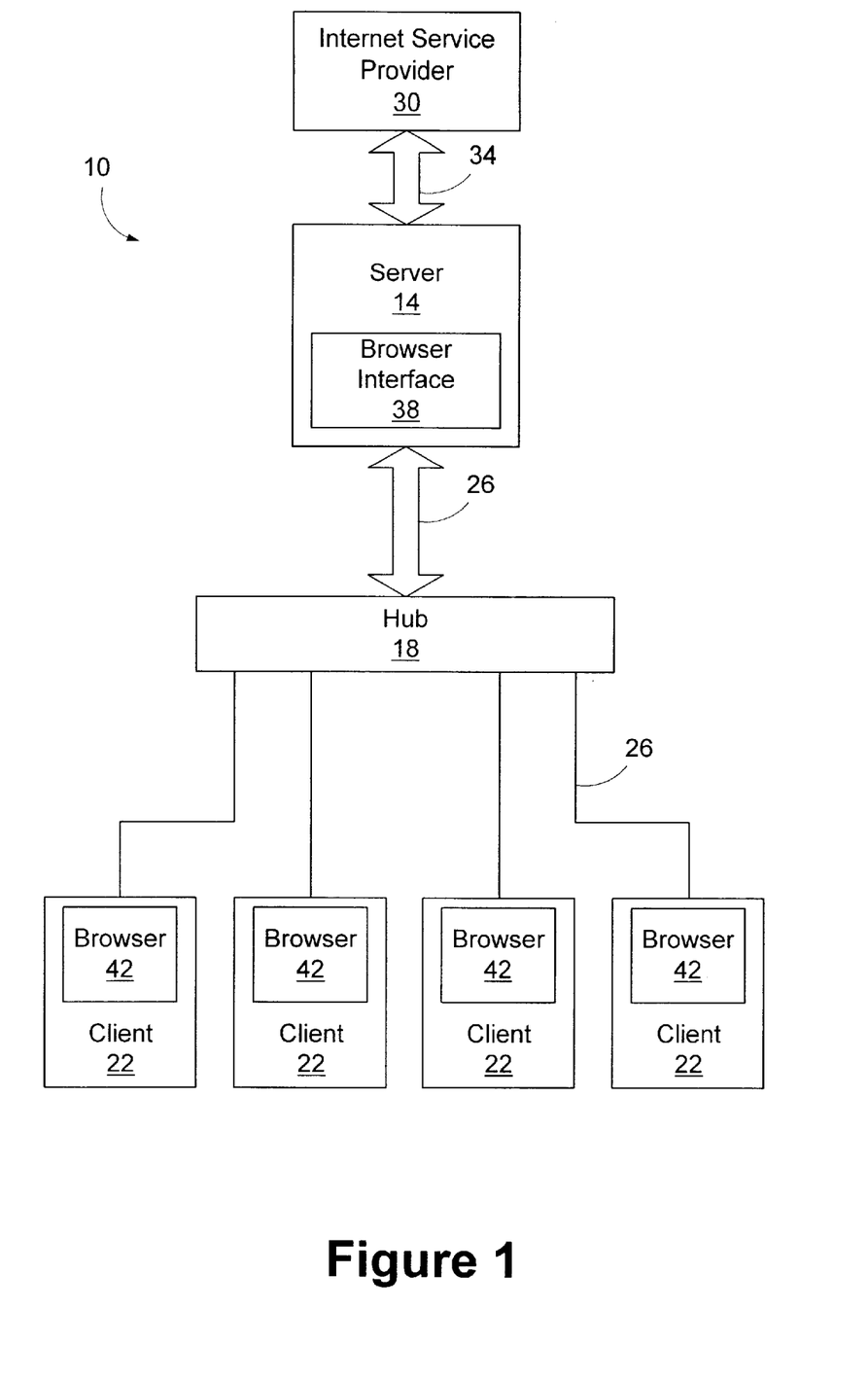
FIG. 1 is a simplified block diagram of a computer network in accordance with the present invention.

Referring to FIG. 1, a block diagram of a computer network 10 is shown. The computer network 10 may be configured using a variety of known topologies. For example, the computer network 10 may be configured as a ring, bus, or any other known method of interconnecting computers. In one embodiment, the computer network 10 is configured using a star topology and comprises a server 14, a hub 18, and a plurality of clients 22 that are coupled to the hub 18. It is contemplated that the hub 18 may comprise of a variety of switching or routing devices depending upon the particular application.

The hub 18 may be used as an intermediary between the server 14 and the clients 22. Generally, the hub 18 directs the flow of data between the server 14 and the clients 22. For example, each client 22 attached to the hub 18 may be identified by a unique address. Accordingly, based on the unique address, data may be routed from the server 14 to the appropriate client 22 through the hub 18. Furthermore, the hub 18 may control the flow of data from the clients 22 to the server 14 (i.e., the hub 18 may be a bi-directional device.) Moreover, the hub 18 may operate in conjunction with the server to transfer data between two clients 22.

Although only one hub 18 is shown in FIG. 1, it is contemplated that a plurality of hubs 18 may be included in the computer network 10, which may increase the number of clients 22 that may be attached to the network 10. For example, in one embodiment, each hub 18 may be coupled to eight clients 22. Once a hub 18 is at maximum capacity, an additional hub 18 may be attached to the filled hub 18 and eight additional clients 22 may be attached to the empty hub 18. It is contemplated that the network 10 may be designed to service any number of clients 22, and in one embodiment, three hubs 18 may be stacked, as described above, and the server 14 may be connected to twenty-four clients 22.

It is contemplated that a variety of protocols may be used to control the flow of data between the server 14 and the clients 22. For example, the server 14 and the clients 22 may transfer data using TCP/IP, SNA, APPN, or any other protocol adapted to facilitate the movement of data. In one embodiment, transferring data between the server 14 and the clients 22 requires client software operating on the clients 22 and server software operating on the server 14. The client software and the server software cooperate to transfer and receive data. For example, the sender (e.g., client 22 or server 14) may encapsulate data into a packet. The packet may include any additional information (e.g., addresses, etc.) that may be necessary to successfully transmit the packet across the network 10 to a receiver (e.g., client 22 or server 14.) The receiver may decapsulate the packet removing any undesired information. Once decapsulated, the data contained in the packet may be processed.

The clients 22 may be personal computers (PCs). For example, the clients 22 may be IBM compatible PCs or Macintosh® computers. Moreover, each client 22 may include a network interface card (not shown) that provides the necessary hardware for data to be transferred to the network 10. In addition to the client software, each client 22 may include an operating system, such as Windows® 95/98, Windows® NT, MAC OS7/8, etc.

The server 14 may be connected to the hub 18 using a network interface card (not shown.) As with any connection in the network 10, network interface cables 26 may be used to interconnect devices on the network 10. For example, the electrical connection between the server 14 and the hub 18 may be established using coaxial cable, twisted pair cable, fiber optic cable, or any other material conducive to carrying a signal. In addition, it is contemplated that the server 14 may be connected to an internet service provider (ISP) 30 using a variety of hardware configurations, such as ISDN, T1, etc. In one embodiment, the server 14 may be connected to the internet service provider 30 using a modem (not shown) and a connection to a local telephone line 34.

In one embodiment, the server 14 may be "headless," requiring remote service and administration. For example, the server 14 may be placed in the network 10 without being connected to a keyboard, monitor, mouse, or any other user input/output devices. Such a headless configuration is ideally suited for use in a setting where the server 14 is treated more as an information appliance to enhance the network, rather than the central core of the network 10. For example, a small business using a simple peer-to-peer network 10 arrangement may wish to have additional services, such as e-mail, centralized Internet access, common file storage and backup, file sharing, etc. Rather than using a more powerful, but more complicated, full-function server, the headless server 14 may be employed to provide the desired functionality without the overhead associated with the full-function server. Users of the headless server 14 may be less sophisticated computer users, and may desire an easily administered interface.

To service or administer the server 14, the server 14 may include a browser interface 38. For example, the server 14 may be accessed by any of the attached clients 22 using a browser 42, such as Microsoft Internet Explorer, Netscape Navigator, etc. The server 14 may be hard coded with a default IP address prior to being shipped to an end user. For example, the IP address 192.168.1.1 is a default dead net address from the Internet Assigned Numbers Authority (IANA) and may be used as an initial IP address. Once the network 10 is connected, the browser 42 that has been installed on the clients 22 may be pointed to the default IP address that has been designated in the server 14. Using the browser 42, the clients 22 may access a simple to use browser interface 38 that has been preloaded in the server containing a list of options for the server 14. The browser interface 38 may include a simple to use graphical user interface allowing the client 22 to easily access and customize the configuration of the server 14.

In one embodiment, to simplify configuring the initial setup of the clients 22 (e.g., configuring the browsers 42 to access the browser interface 38), a companion disk containing configuration software may be shipped with the server 14. The configuration software may be installed on the clients 22 simplifying the configuration of the individual browsers 42. Alternatively, it is contemplated that a network application program, such as TCP/IP, may be pre-installed on the clients 22 and the browsers 42 may be manually configured.

Figure 2:
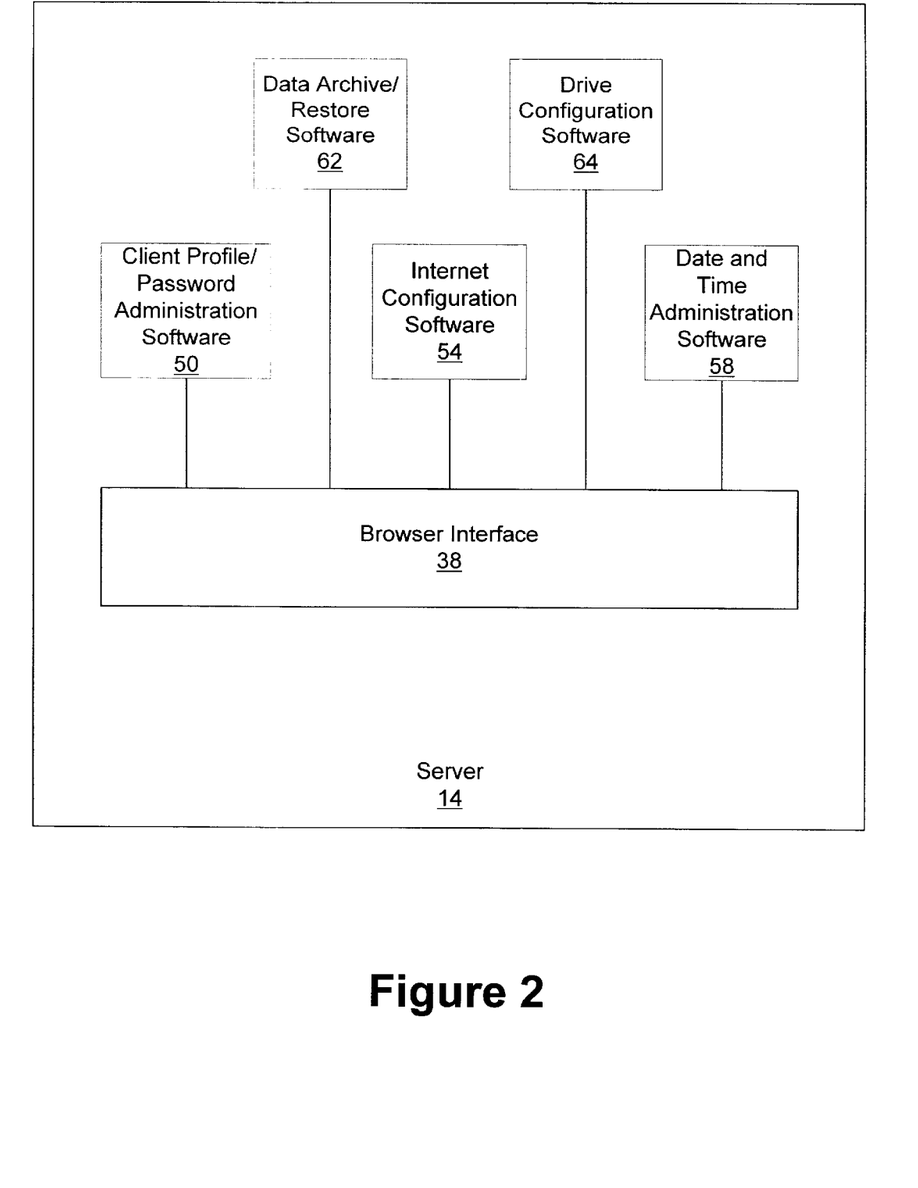
FIG. 2 is a diagram illustrating software applications executed by a server in the computer network of FIG. 1.

Referring to FIG. 2, a block diagram illustrating examples of various administration features that may be accessed using the browser interface 28 of the server 14 is provided. As described above, the browser interface 38 may be used in conjunction with the browsers 42 of the clients 22 to simplify the administration, configuration, and customization of the server 14. It is contemplated that, depending upon the particular application, additional features may be added and administrated using the browser interface 38 described above. In one embodiment, the browser interface 38 installed on the server 14 may includes client profile and password administration software 50, internet configuration software 54, date and time administration software 58, data archiving and restoration software 62, and drive configuration software 64.

As illustrated above, the server 14 may be interconnected with the clients 22 in the network 10. Before the clients 22 may access resources available on the server 14, each user is identified by a user profile that may be protected with a user password. It is contemplated that the first client 22 connected to the network 10 may access the server 14 via its browser 42 and the browser interface 38 using an administration profile and password provided by the manufacturer. Once the administrator has accessed the server 14, the administration profile and password may be changed, and the other users may be assigned user profiles and passwords. User profiles and passwords may be added, deleted, and changed as often as desired. Moreover, any user that has accessed the server 14 using the administration profile and password may have access to the administration features of the software 50, 54, 58, 62, and 64 on the server 14.

As illustrated above, the server 14 may be connected to the internet service provider 30. Using the browser interface 38 and the administration profile and password, any client 22 may access and configure the server 14 with the appropriate internet settings. For example, the internet service provider account information may be designated in the server 14, e-mail server addresses may be initialized, and internet permissions assigned. Depending upon the desired internet usage, individual users may be granted internet access while other users connected to the network may be denied internet access.

The date and time administration software 58 allows a user to access the current date, time, and time zone set for the server 14 by the manufacturer, since the default information for these items is many times incorrect for the particular user. The browser interface 38 in conjunction with the administrator profile and password allows the information to be updated reflecting the locale of the user.

Figure 3:
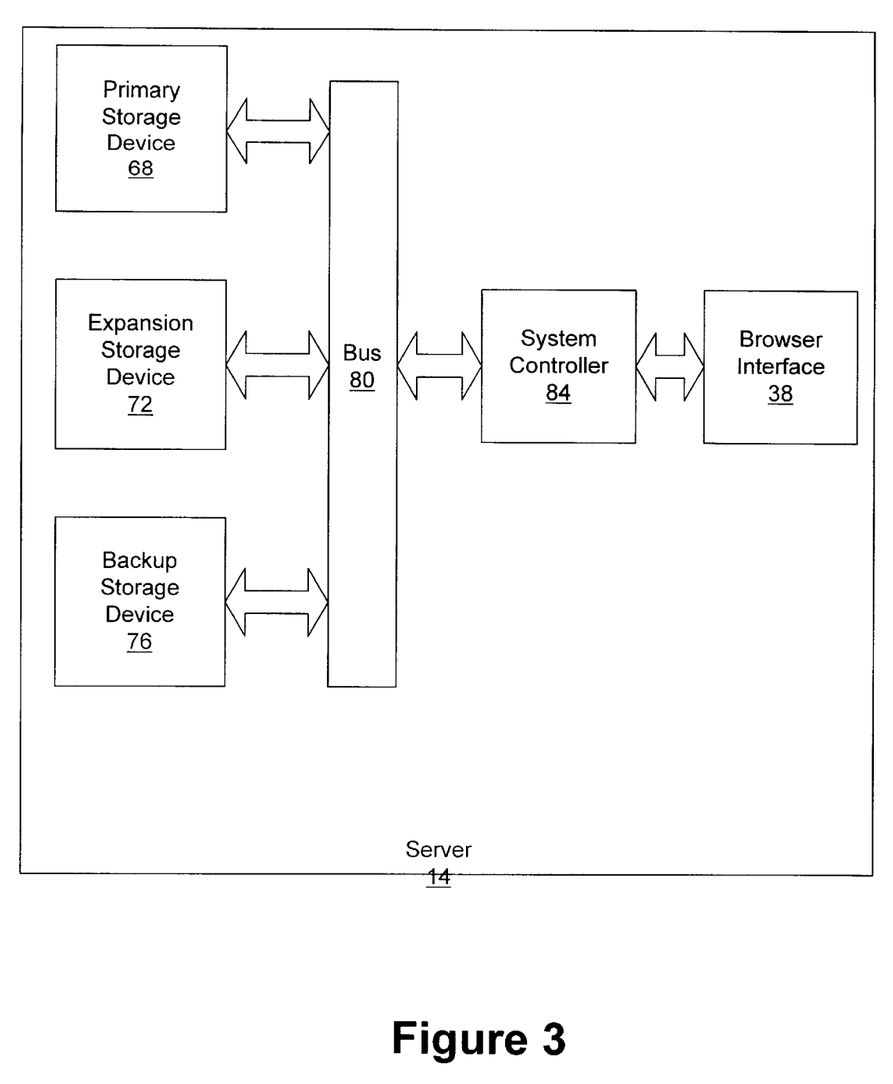
FIG. 3 is a simplified block diagram of the server of FIG. 1 illustrating data storage and retrieval hardware in accordance with one embodiment of the present invention.

The data archiving and restoration software 62 may be accessed using the browser interface 38 and may be best be understood with reference to FIG. 3. FIG. 3 is a simplified block diagram of the server 14 used to illustrate the operation of the data archiving and restoration software 62. In the illustrated embodiment, the server 14 includes a primary storage device 68, an expansion storage device 72, a backup storage device 76, a bus 80, and a system controller 84. The storage devices 68, 72, and 76 may be coupled to the bus 80, and the system controller 84 may control the flow of data between the clients 22 and the storage devices 68, 72, and 76. Moreover, the system controller 84 may control the flow of data between the individual storage devices 68, 72, and 76. The system controller 84 may be comprised of a variety of known devices. For example, the system controller 84 may be a microprocessor, microcontroller, or any other type of control logic. It is contemplated that the primary storage device 68 may comprise any one of a variety of nonvolatile memory devices. Moreover, the storage capacity of the primary storage device 68 may be varied as a matter of design choice, and in one embodiment, the primary storage device 68 is a 6-gigabyte hard disk drive.

The primary storage device 68 may be used to save client data, system configuration settings, a factory fresh copy of the server operating system, or any other appropriate data. Client data may include files placed on the primary storage device 68 by any one of the attached clients 22. For example, depending upon the configuration, each user connected to the server 14 may create a user folder on the primary storage device 68. Once the user folders are created, the users may store data, such as documents, email messages, etc., on the primary storage device 68. System configuration settings may include any changes made to the factory configuration of the server 14. For example, the primary storage device 68 may save user names and passwords, internet service configurations, the current date and time, and the data archive schedule. The factory fresh copy of the operating system may be used to return the server 14 to a factory fresh configuration.

The expansion storage device 72 may comprise a variety of nonvolatile memory devices. Moreover, the storage capacity of the expansion storage device 72 may be varied as a matter of design choice, and in one embodiment, the expansion storage device 72 is a 8.4-gigabyte removable hard disk drive. The expansion storage device 72 may be used to extend the overall data storage capacity of the server 14. For example, the expansion storage device 72 may function as an extension of the primary storage device 68 and may store the same types of data (e.g., client data, system configuration settings, etc.)

The system controller 84 may determine the allocation of storage space between the primary storage device 68 and the expansion storage device 72. For example, in one embodiment, some users may have access to both the primary storage device 68 and the expansion storage device 72, and the users may determine whether to save client data on the primary storage device 68 or the expansion storage device 72. Alternatively, the system controller 84 may automatically store system configuration data and the copy of the operating system on the primary storage device 68. Furthermore, although only one expansion storage device 72 is shown, it is contemplated that the expansion storage device 72 may be comprised of a plurality of removable hard disk drives or other nonvolatile memory devices.

The data archiving and restoration software 62 may be used to backup data stored on the primary and expansion storage devices 68, 72. Using the browser interface 38, a data archive schedule may be configured to automatically archive the data saved on the primary and expansion storage devices 68, 72 onto the backup storage device 72. For example, the administrator may configure the settings of the server 14 to select an automated backup routine. In one embodiment, the archive schedule may be set to backup the primary and expansion storage devices 68, 72 once a day at a particular time, or alternatively, the archive schedule may be selected to run once a week at a particular time. It is contemplated that other archive schedules may be configured and adapted depending upon the particular application.

In another embodiment, the primary and expansion storage devices 68, 72 may be archived manually. For example, rather than having an automated schedule, the backup routine may be started manually by the clients 22 using the browser interface 38. For example, using easy to operate "push buttons" in software, the clients 22 may direct their browsers 42 to the browser interface 38 of the server 14 and initiate the backup routine.

The backup storage device 76 may comprise a variety of nonvolatile memory devices. For example, the backup storage device 76 may be a 6.4-gigabyte removable hard disk drive. Because the backup storage device 76 may be removable, it is contemplated that a plurality of backup storage devices 76 may be used on a rotating schedule. For example, two hard disk drives may be used to backup the primary and expansion storage devices 68, 72. In one illustrative embodiment, the first hard disk drive may be used on Monday, Wednesday, and Friday, and the second hard disk drive may be used on Tuesday and Thursday. Because the archived data may be stored on more than one disk, alternating backup storage devices 76 may reduce the risk of losing data. It is contemplated that other archiving schemes may be used using any number of backup storage devices 76.

It is contemplated that a variety of known compression algorithms may be used to during the backup routine to maximize the storage capacity of the backup storage device 76. In one embodiment, the data stored on the primary and expansion storage devices 68, 72 is compressed and transferred as a mirror image to the backup storage device 76. For example, the file structure of the primary and expansion storage devices 68, 72, such as directory names and file names, may remain unchanged on the backup storage device 76. In addition, rather than blindly transferring all files to the backup storage device 76, only those files that have changed in-between scheduled archives are updated. In one embodiment, the system controller 84 may compare the contents of the backup storage device 76 with the contents of the primary and expansion storage devices 68, 72, and based on the comparison, only update the backup storage device 76 with data that has changed. For example, if between scheduled archives, a new user is added to the configuration of the server 14, the new client profile, password, and other related data may be detected by the system controller 84 and archived on the backup storage device 76. By only updating those files that have changed between scheduled archives, the backup routine may operate more efficiently and consume less time.

The backup storage device 76 may be used to restore the primary and expansion storage devices 68, 72. For example, if the data stored on the primary storage device 68 or expansion storage device 72 is corrupted or lost, the data archived on the backup storage device 76 may be used to replace the lost or corrupted data. Moreover, it is contemplated that the backup storage device 76 may be used to restore system configuration settings, user data, internet configurations, or any other data that has been archived on the backup storage device 76.

In one embodiment, an automatic restore routine may be initiated by users from the clients 22 using the browser interface 38. For example, using the administrator profile and password and easy to operate "push buttons" in software, the clients 22 may direct their browsers 42 to the browser interface 38 of the server 14 and initiate the automatic restore routine. Once initiated, the system controller 84 may automatically transfer files and directories from the backup storage device 76 to the primary and expansion storage devices 68, 72. Using the automatic restore routine, user data and system settings, such as user profiles, passwords, internet configurations, data backup schedules, etc., may be automatically restored with the data and system configuration settings archived on the backup storage device 76.

As described above, in one embodiment, the data stored on the primary storage device 68 and the expansion storage device 72 is mirrored and stored in a compressed format on the backup storage device 76. Because directory paths and file names remain the same on the backup storage device 76, the users may easily filter through and view the archived data. In one embodiment, rather than performing a complete restore of the server 14, using the browser interface 38, a user of a client 22 may access the backup storage device 76 and selectively restore particular files. For example, system settings, such as user profiles, passwords, internet configurations, data backup schedules, etc., may be restored without restoring other archived data. Moreover, client files (e.g., documents, e-mail messages, etc.) may individually be restored as needed.

Because the server 14 in the illustrated embodiment is configured in a headless configuration, there is no central administration point. Rather, the administrator accesses the administrative functions through browser 42 on one of the clients 22 to the browser interface 38 on the server 14. If additional hardware is to be added to the server 14, the configuration should be mostly automated to reduce the burden on the administrator.

The server 14 may be initially configured without both the expansion storage device 72 and the backup storage device 76 installed, based on the needs of the users. At some time after the initial purchase, the user may wish to add one or both of the expansion storage device 72 and the backup storage device 76. The drive configuration software 64, as described in greater detail below in reference to FIG. 4, detects the presence of a new storage device 90 and configures the new hardware based on the hardware already installed. This helps prevent the administrator from misconfiguring the added hardware, thus reducing the likelihood of data loss or improper operation of the server 14.

Figure 4:
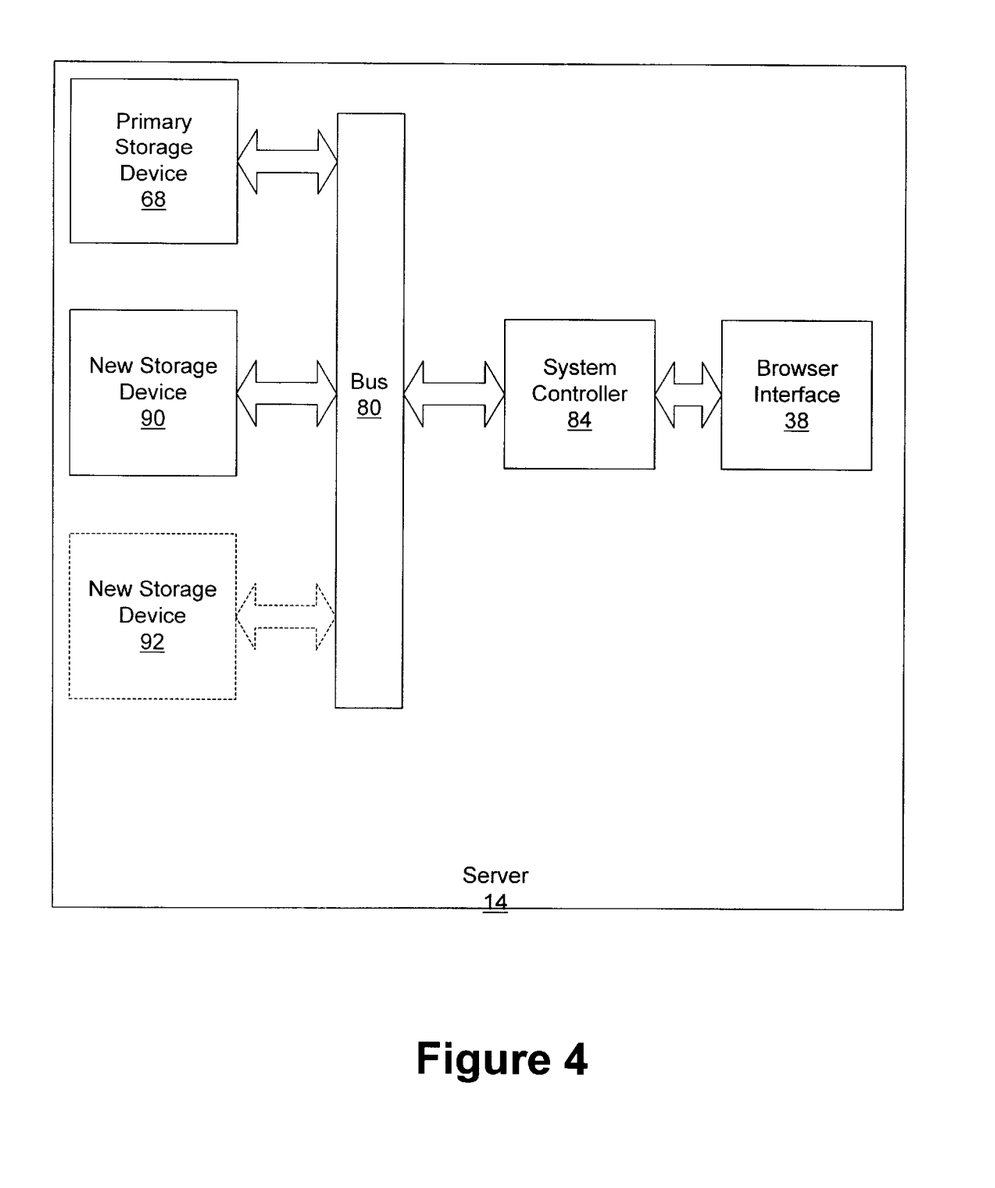
FIG. 4 is a simplified block diagram of the server of FIG. 1 illustrating a new data storage being installed.

In the illustrated embodiment, the expansion storage device 72 and the backup storage device 76 are removable hard disk drives, however, it is contemplated that other types of storage devices may be used, such as a tape drive, compact disk read/write drive, or the like. There are several cases that the drive configuration software 64 evaluates to determine the proper configuration.

The first case involves the server 14 having only the primary storage device 68 installed. The administrator, or other user, may purchase a blank, unformatted storage device 90 and install it in the server 14 (e.g., by inserting a removable hard drive into an empty drive bay on the server 14). The drive configuration software 64 detects the new storage device 90 and determines that, previously, only the primary storage device 68 had been installed. At this point, the drive configuration software 64 queries the user to determine whether the new storage device 90 is intended for use as either the expansion storage device 72 or the backup storage device 76. Based on the user input, the drive configuration software 64 formats and configures the new storage device 90 appropriately. For example, if the new storage device 90 is to be used as the backup storage device 76, the drive configuration software 64 enables the data archiving and restoration software 62 to allow periodic or manual data archiving.

The administrator may install two new storage devices 90, 92. The drive configuration software 64 detects the new storage devices 90, 92 similar to the previous case and queries the user of the intended purpose of the first new storage devices 90. Based on the user input, the drive configuration software 64 formats and configures the designated new storage device 90 and formats and configures the remaining new storage device 92 as the non-selected type without input from the user. For example, if the user selects that the first new storage device 90 be used as the expansion storage device 72, the second new storage device 92 is automatically formatted as the backup storage device 76.

The second case involves the server 14 having only one of the expansion storage device 72 and the backup storage device 76 already installed. The drive configuration software 64 only allows one of each type, so the new storage device 90 is automatically configured as the other type without input from the user. For example, if the backup storage device 76 is already installed, the drive configuration software 64 formats and configures the new storage device as the expansion storage device 72.

In another embodiment, the administrator may purchase the new storage device 90 preformatted and previously configured as either the expansion storage device 72 or the backup storage device 76. A data file may be previously stored on the new storage device 90 designating its desired application. The drive configuration software 64 detects the preformatted new storage device 90, determines its application, and configures the server 14 appropriately without input from the user. The drive configuration software 64 may perform a conflict check to determine if the user is attempting to install two storage devices of the same type. If such a conflict arises, the drive configuration software 64 may ask the user if the new storage device 90 should be reformatted and configured as the other type. For example, if the user attempts to install a second backup storage device 76, the drive configuration software 64 may ask the user if the new storage device 90 should be reformatted as the expansion storage device 72. Alternatively, the drive configuration software 64 may simply prevent the installation of the duplicate storage device.

In one embodiment, the drive configuration software 64 may also check for other mismatch potential conditions, such as a sizing mismatch in the backup storage device 76. The drive configuration software 64 may be configured with a default compression ratio that it uses to evaluate the adequacy of the backup storage device 76. For example, consider the case where the total capacity of the primary storage device 68 and the expansion storage device 72 is 20 gigabytes. If the default compression ratio is 50%, the size of the backup storage device 76 should be about 10 gigabytes to be able to provide a full backup. The drive configuration software 64 may alert the user if a backup storage device 76 smaller than 10 gigabytes is installed.

It is realized that the actual compression ratio achievable may be more or less depending on the type of data being stored on the primary storage device 68 and the expansion storage device 72. For example, if users are storing large amounts of compressed files, such as ZIP files or JPG image files, the achievable compression ratio will be much lower. On the other hand, if most of the files stored are highly compressible, such as bitmaps or text documents, the achievable compression may be much higher. The user may be counseled by the drive configuration software 64 of such compression variables if an apparent mismatch occurs. The user, based on knowledge of the types of data stored on the primary storage device 68 and the expansion storage device 72 may choose to accept the mismatched configuration, or to abort the installation and procure a more appropriately sized backup storage device 76.

Figure 5:
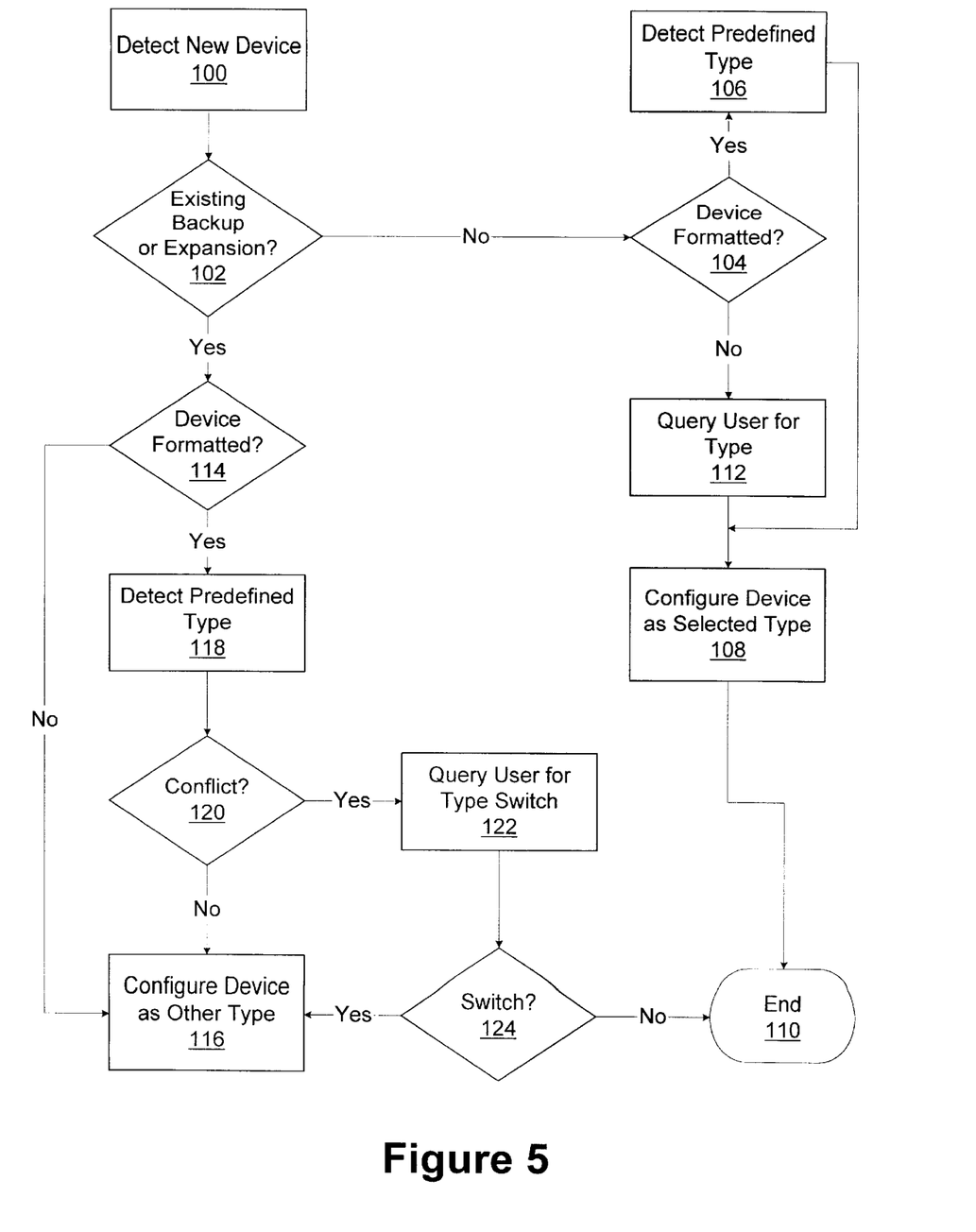
FIG. 5 is a flow diagram illustrating a method for configuring storage devices in accordance with the present invention.

Turning now to FIG. 5, a flow diagram of a method for configuring storage devices is provided. The new storage device 90 is detected in block 100. The server 14 is evaluated in block 102 to determine if the expansion storage device 72 or the backup storage device 76 is already installed. If neither is installed, it is determined if the new storage device 90 is formatted in block 104. If the new storage device 90 is formatted, the predetermined type is detected in block 106, the new storage device 90 is configured in block 108 as the predetermined type, and the method terminates at block 110. If the new storage device 90 was not formatted in block 104, the user is queried for the type in block 112, and the new storage device is configured (i.e., and formatted) in block 108.

If one of the expansion storage device 72 or the backup storage device 76 was already installed in block 102, it is determined if the new storage device 90 is formatted in block 114. If the new storage device 90 is not formatted, it is configured as the other type (e., expansion storage device 72 if the backup storage device 76 is already installed) in block 116. If the new storage device 90 is formatted in block 114, the predetermined type is detected in block 118. If a conflict exists between the predetermined type and the type of the previously installed storage device in block 120, the user is queried to determine if the type of the new storage device 90 should be switched to the other type in block 122. If the user elects to switch the type in block 124, the new storage device 90 is configured as the other type in block 116. Otherwise, the configuration method is aborted and terminates in block 110 without adding the new storage device 90.

If the second new storage device 92 is also installed, the method of FIG. 5 is repeated. Although the illustrative embodiment described above is limited to having only one expansion storage device 72 and one backup storage device 76, it is contemplated that the technique described herein can be scaled to accommodate any configuration. For example, the server 14 could include two expansion storage devices 72. The method of FIG. 5, in light of this specification, may be adapted to account for the additional number of allowable configurations with additional decision steps.

Determining the proper configuration for the new storage device 90 based on the configuration of previously installed storage devices 68, 72, 76 lessens the likelihood of a conflict, improper installation, or data loss. Because many of the configurations may be auto-detected (i.e., without input from the administrator), the demands placed on the administrator (e.g., time, knowledge, etc.) are lessened.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for configuring storage devices, comprising:
   detecting an existing storage device configuration;
   determining if the existing storage device configuration comprises one of a backup storage device configuration and an expansion storage device configuration;
   detecting the existence of a new storage device; and
   configuring the new storage device as the other of the backup storage device configuration and the expansion storage device configuration in response to determining that the existing storage device configuration comprises one of the backup storage device configuration and the expansion storage device configuration.

2. The method of claim 1, further comprising:

prompting a user to select one of the backup storage device configuration and the expansion storage device configuration in response to determining that the existing storage device configuration does not comprise one of the backup storage device configuration and the expansion storage device configuration; and configuring the new storage device as the selected one of the backup storage device configuration and the expansion storage device configuration.

3. The method of claim 1, further comprising:

determining if the existing storage device configuration comprises a primary storage device configuration; and prompting a user to select one of the backup storage device configuration and the expansion storage device configuration; and configuring the new storage device as the selected one of the backup storage device configuration and the expansion storage device configuration.

4. The method of claim 1, further comprising detecting if the new storage device has a predetermined configuration type specifying one of the backup storage device configuration and the expansion storage device configuration.

5. The method of claim 4, wherein configuring the new storage device further comprises configuring the new storage device as the predetermined configuration type.

6. The method of claim 5, further comprising determining if the predetermined configuration type conflicts with the existing storage device configuration.

7. The method of claim 6, wherein the existing storage device configuration comprises one of the backup storage device configuration and the expansion storage device configuration, and configuring the new storage device further comprises changing the predetermined type to the other of the backup storage device configuration and the expansion storage device configuration in response to predetermined configuration type conflicting with the existing device configuration.

8. A computer system, comprising:

an existing storage device having an existing storage device configuration;

a new storage device; and a processor adapted to determine if the existing storage device configuration comprises one of a backup storage device configuration and an expansion storage device configuration, detect the existence of a new storage device, and configure the new storage device as the other of the backup storage device configuration and the expansion storage device configuration in response to determining that the existing storage device configuration comprises one of the backup storage device configuration and the expansion storage device configuration.

9. The computer system of claim 8, wherein the processor is further adapted to prompt a user to select one of the backup storage device configuration and the expansion storage device configuration in response to determining that the existing storage device configuration does not comprise one of the backup storage device configuration and the expansion storage device configuration and configure the new storage device as the selected one of the backup storage device configuration and the expansion storage device configuration.

10. The computer system of claim 8, wherein the processor is further adapted to determine if the existing storage device configuration comprises a primary storage device configuration, prompt a user to select one of the backup storage device configuration and the expansion storage device configuration, and configure the new storage device as the selected one of the backup storage device configuration and the expansion storage device configuration.

11. The computer system of claim 8, wherein the processor is further adapted to detect if the new storage device has a predetermined configuration type specifying one of the backup storage device configuration and the expansion storage device configuration.

12. The computer system of claim 11, wherein the processor is further adapted to configure the new storage device as the predetermined configuration type.

13. The computer system of claim 11, wherein the processor is further adapted to determine if the predetermined configuration type conflicts with the existing storage device configuration.

14. The computer system of claim 13, wherein the existing storage device configuration comprises one of the backup storage device configuration and the expansion storage device configuration, and the processor is further adapted to change the predetermined type to the other of the backup storage device configuration and the expansion storage device configuration in response to the predetermined configuration type conflicting with the existing device configuration.

15. A computer system, comprising:

a processor;

an existing storage device having an existing storage device configuration;

a new storage device; and a program storage device encoded with instructions that, when executed by the processor, perform a method for configuring storage devices in a computer system, the method comprising:

detecting the existing storage device configuration;

determining if the existing storage device configuration comprises one of a backup storage device configuration and an expansion storage device configuration;

detecting the existence of the new storage device; and configuring the new storage device as the other of the backup storage device configuration and the expansion storage device configuration in response to determining that the existing storage device configuration comprises one of the backup storage device configuration and the expansion storage device configuration.

16. The computer system of claim 15, wherein the method further comprises:

prompting a user to select one of the backup storage device configuration and the expansion storage device configuration in response to determining that the existing storage device configuration does not comprise one of the backup storage device configuration and the expansion storage device configuration; and configuring the new storage device as the selected one of the backup storage device configuration and the expansion storage device configuration.

17. The computer system of claim 15, wherein the method further comprises:

determining if the existing storage device configuration comprises a primary storage device configuration; and prompting a user to select one of the backup storage device configuration and the expansion storage device configuration; and configuring the new storage device as the selected one of the backup storage device configuration and the expansion storage device configuration.

18. The computer system of claim 15, wherein the method further comprises detecting if the new storage device has a predetermined configuration type specifying one of the backup storage device configuration and the expansion storage device configuration.

19. The computer system of claim 18, wherein configuring the new storage device in the method further comprises configuring the new storage device as the predetermined configuration type.

20. The computer system of claim 19, wherein the method further comprises determining if the predetermined configuration type conflicts with the existing device configuration.

21. The computer system of claim 20, wherein the existing storage device configuration comprises one of the backup storage device configuration and the expansion storage device configuration, and configuring the new storage device in the method further comprises changing the predetermined type to the other of the backup storage device configuration and the expansion storage device configuration in response to the predetermined configuration type conflicting with the existing device configuration.

22. A computer system, comprising:

means for detecting an existing storage device configuration;

means for determining if the existing storage device configuration comprises one of a backup storage device configuration and an expansion storage device configuration;

means for detecting the existence of a new storage device; and means for configuring the new storage device as the other of the backup storage device configuration and the expansion storage device configuration in response to determining that the existing storage device configuration comprises one of the backup storage device configuration and the expansion storage device configuration.

* * * * *